United States Patent

Murphree

[11] 3,922,630
[45] Nov. 25, 1975

[54] AUTOMATIC VEHICLE POSITIONING SYSTEM

[75] Inventor: Francis J. Murphree, Sunnyside, Fla.

[73] Assignee: The United States of America as represented by the Secretary of the Navy, Washington, D.C.

[22] Filed: Dec. 3, 1964

[21] Appl. No.: 415,825

[52] U.S. Cl. .................. 340/3 R; 340/3 T; 340/6 R
[51] Int. Cl.² ...................... G01S 9/66; G01S 3/80
[58] Field of Search ... 244/3, 77 C; 114/144, 235.2, 114/236, 237; 343/9, 7, 8, 112 TC, 7, 107; 340/3, 3 D, 3 T, 6, 16, 16 R, 4, 4 E

[56] References Cited
UNITED STATES PATENTS

| | | | |
|---|---|---|---|
| 1,666,897 | 4/1928 | Hammond, Jr. | 340/4 |
| 3,086,490 | 4/1963 | Nichols | 114/235 |
| 3,121,228 | 2/1964 | Kalmus | 340/4 X |
| 3,153,220 | 10/1964 | Hagemann | 340/3 |

*Primary Examiner*—Richard A. Farley
*Attorney, Agent, or Firm*—Richard S. Sciascia; Don D. Doty

EXEMPLARY CLAIM

1. Means for navigating a plurality of substantially tandemly disposed vehicles along the predetermined course of one thereof comprising in combination,
   a first vessel,
   means mounted on said first vessel for determining the course thereof and aligning a predetermined reference means therewith,
   a second vessel adapted for being driven in tandem with said first vessel,
   means mounted on said second vessel for broadcasting a predetermined signal indicating the bearing thereof,
   means attached to said first vessel course determining means for determining the bearing deviation of said second vessel relative to said predetermined reference means in response to said second vessel bearing indication signal and for producing an error signal proportional thereto,
   means connected between said second vessel bearing deviation determining means and said second vessel for aligning said second vessel with said reference means and the course of said first vessel in response to said error signal.

21 Claims, 5 Drawing Figures

INVENTOR.
FRANCIS J. MURPHREE

INVENTOR.
FRANCIS J. MURPHREE

AUTOMATIC VEHICLE POSITIONING SYSTEM

The invention described herein may be manufactured and used by or for the Government of the United States of America for governmental purposes without the payment of any royalties thereon or therefor.

The present invention relates generally to navigation control systems and in particular is a system for accurately navigating a slave vehicle so that it will accurately travel the intended ground course of a master vessel regardless of the external ambient forces applied to either or both thereof. Even more specifically, it is a system for guiding a forerunning marine mine sweeping or hunting vehicle over a ground course intended to be taken or paralleled by an immediately following ship, regardless of the natural external ambient forces such as wind and water currents being applied to either or both thereof.

In the past, it has been extremely difficult, if not impossible, to maintain coincident the ground courses of a mine sweeping vehicle and the ship preceeding or following it. This is, for example, due to the fact that wind and water currents may play upon one or both during mine sweeping operations. When such conditions occur, the ship, for instance, must maintain a heading that is different in direction from the desired ground course, if it is to accurately travel that ground course. And if the mine sweeping vehicle is guided or controlled to sweep dead ahead of the longitudinal axis of the ship, its ground course will obviously be different from that of the ship. Accordingly, the ship's heading may not be used as a reference for this purpose, and the actual intended ground course of the ship must be used as a reference parameter instead. But, to date, the means available for regulating the attitude of a forerunning mine sweeping vehicle to effect its travel along the intended ground course of a ship has left a great deal to be desired from controllability or navigation accuracy standpoints.

The present invention overcomes most of the disadvantages of the prior art devices, in that it performs the function of controlling the attitude and travel direction of a mine sweeping vehicle with considerably improved accuracy and, furthermore, it does it automatically. Moreover, the travel direction is expeditiously controlled in such manner as to enable the mine sweeping vehicle to sweep directly over the ground course to be traveled by a following master ship or, in the alternative, some preselected ground course substantially parallel thereto. In addition, the subject invention has such inherent operational flexibility incorporated therein that it may be used to control a minesweeping or minehunting vehicle either in the forerunning or aft-running positions from the master ship.

It is, therefore, an object of this invention to provide an improved automatic vehicle positioning system.

Another object of this invention is to provide a method and means for minesweeping or minehunting the intended ground course of a ship at a predetermined time and distance ahead or behind thereof.

Still another object of this invention is to provide an improved control system for navigating a slave vehicle along or parallel to the fore or aft projection of the predetermined course of a master vessel.

A further object of this invention is to provide an improved method and means for navigating a plurality of tandemly disposed vehicles along the same predetermined course.

A further object of this invention is to provide an improved method and means for automatically navigating a pair of tandemly disposed marine vessels along substantially the same ground course, regardless of the external ambient natural forces, such as wind and water currents, that are being applied thereto.

Other objects and many of the attendant advantages will be readily appreciated as the subject invention becomes better understood by reference to the following detailed description when considered in conjunction with the accompanying drawing wherein.

Figure 1:
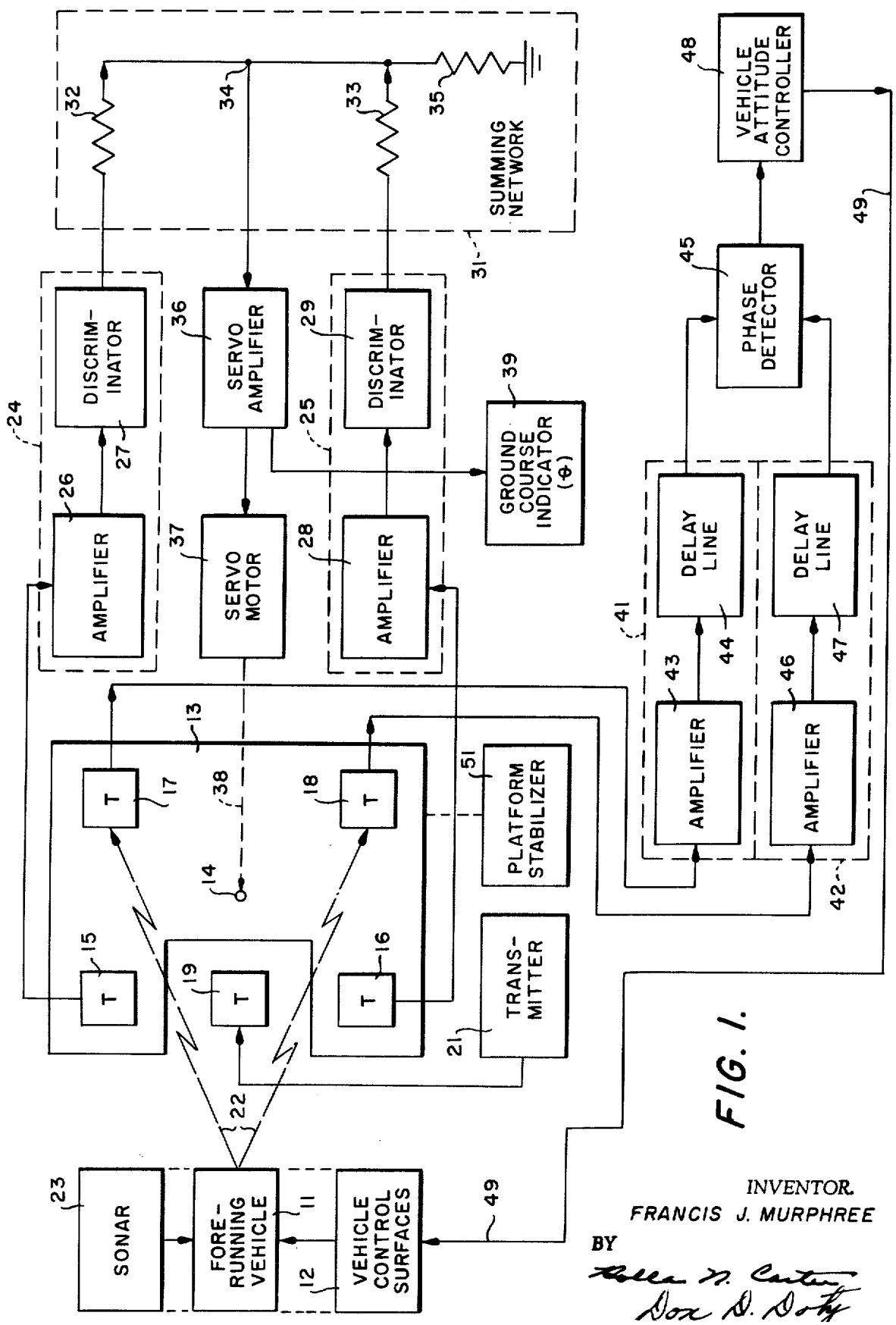
FIG. 1 is a block diagram of the system constituting the subject invention.

Referring now to FIG. 1, there is shown a forerunning vehicle 11 having conventional attitude control surfaces 12 attached thereto in the substantially conventional manner for the purpose of guiding the vehicle along a given course within its predetermined environmental medium. In this particular preferred embodiment, said forerunning vehicle is disclosed as a submarine vehicle which is intended to run at some preselected height above the ocean floor. However, it should be understood, that this embodiment is not illustrated by way of limitation, but is merely a typical, exemplary type thereof which may be employed to perform the objective functions of this invention, as will be explained further, subsequently, in the discussion of the operation of the invention.

Disposed upon a master ship (shown in FIG. 3) which operates in conjunction with the forerunning vehicle 11, is a platform 13 adapted to be rotated about a predetermined central location 14 by any conventional shafting, bearing, and support means, (not shown). This platform 13 has physically mounted thereon, a plurality of electroacoustical transducers 15, 16, 17, and 18, each of which is designed to receive acoustical signals from within the subaqueous medium within which the aforesaid forerunning vehicle 11 is traveling and produce an electrical signal proportional thereto. Also disposed as appropriate on said ship, is another electroacoustical transducer 19, which is intended to be used as a transmitting transducer for broadcasting acoustical energy either directionally or omnidirectionally as desired, but in such manner as to enable it to be received by transducers 15 and 16 after it has been reflected from the ocean floor along the ground course immediately preceeding said ship. As shown in this embodiment, transducer 19 is not disposed upon or mounted upon rotatable platform 13, but if expedient to do so, it may be rotatably mounted thereon or at any other desired location which will effect the optimum operation thereof. Transducer 19 is connected to be energized by a sonar transmitter 21, or the like.

Transducers 17 and 18 should be so disposed on rotatable platform 13 that a bisecting axis centrally located therebetween coincides with a similar bisecting axis between the aforesaid transducers 15 and 16. Furthermore, transducers 15 through 18 should be so positioned on platform 13 that imaginary lines respectively interconnecting transducers 15 – 16 and 17 – 18 are parallel to each other and normal to the aforesaid coinciding axes. The faces of transducers 17 and 18 face forward and are, likewise, normal to said axes.

A transmitting sonar 23, or some other appropriate sound source, is mounted on vehicle 11, and sonic energy is broadcast therefrom in order to provide a convenient means for locating vehicle 11 at any given instant, as will be explained further subsequently during the explanation of the invention. Of course, it should be understood that radio or visual devices, or the like, may likewise be employed for indicating the instantaneous position of said vehicle 11, if the operational circumstances so warrant.

In this particular arrangement, the aforesaid transducers 15, 16, and 19, combine to form a portion of a Doppler system which, in turn, is used to determine the true course over the ocean floor that the master ship is traveling, regardless of its heading.

The outputs of transducers 15 and 16, are respectively applied to a pair of channels 24 and 25 for the purpose of appropriately converting the signals thereof into useful forms. Accordingly, the output of transducer 15 is applied to the input of an amplifier 26, with the output thereof applied to the input of a discriminator 27. The output of transducer 16 is applied to the input of an amplifier 28, the output of which is fed to the input of a discriminator 29. Of course, amplifier 26 and discriminator 27 constitute the aforesaid processing channel 24, and amplifier 28 and discriminator 29 constitute the aforementioned channel 25. The outputs of discriminators 27 and 29 constitute the outputs of their respective channels and are applied to the inputs of a summing network 31. Actually, in this particular embodiment, the output of discriminator 27 is applied to a resistor 32 and the output of discriminator 29 is applied to a resistor 33, and said resistors are joined at junction 34 to form a series network. The junction of resistors 32 and 33 is also effectively connected through a resistor 35 to ground.

The output from summing network 31 is taken from junction 34 and is applied to the input of a servo amplifier 36, the output of which is coupled to the input of a servo motor 37. Any conventional shafting or gearing arrangement 38 is employed between the output of servo motor 37 and platform 13 for the proper and timely rotation thereof in either direction as dictated by the output of summing network 31.

A ground course indicator 39 is optionally connected to the aforesaid servo amplifier 36 so as to provide an indication of the ground course being traveled by the master ship at any given instant, and this, of course, obviously facilitates the navigation thereof by a human or other operator.

The output of transducers 17 and 18 are respectively applied to a pair of receiver channels 41 and 42 for the appropriate processing of the signals emanating therefrom at any predetermined instant. As indicated in FIG. 1, in practice, the output of transducer 17 is applied to the input of an amplifier 43, the output of which is fed into a variable delay line 44, which, in turn, has its output coupled to one of the inputs of a phase detector 45. Likewise, the output of transducer 18 is coupled to the input of an amplifier 46, and its output is coupled through a variable delay line 47 to another of the inputs of phase detector 45.

The output of phase detector 45 is coupled to a vehicle attitude controller 48 which may, for example, take any preferred conventional form which performs the necessary control function required for any given particular operational environment. Thus, for instance, vehicle attitude controller 48 may be a transmitter which broadcasts either electroacoustical energy or electromagnetic energy, depending upon the type of telemetering control link employed between the aforesaid ship and the aforementioned forerunning vehicle 11. However, since the preferred embodiment herein disclosed preferably employs a cable control between said ship and said vehicle, vehicle attitude controller 48 is such as will produce a signal which may be transmitted along said cable for navigation control purposes. Accordingly, the output of controller 48 is connected by means of telemetering link cable 49 to the input of attitude control surfaces 12 physically connected to vehicle 11 for the direction control thereof.

In event it is anticipated that rough water may be encountered, it is entirely possible that platform 13 may pitch and roll sufficiently to detract from its accuracy when it is being used as a ground course reference parameter and reference platform. Under such circumstances, it would be desirable to effectively stabilize platform 13 in the horizontal plane in such manner that it may still be rotated therein. This, of course, may be effected by attaching the platform (or the means on which it rotates) to any appropriate, conventional stabilized platform or any suitable, conventional platform stabilizing means 51. However, it should be evident that the stabilization of rotatable platform 13 would not be necessary for satisfactory operation during relatively calm water conditions and, therefore, the aforementioned platform stabilizer 51 should be considered optional.

Figure 2:
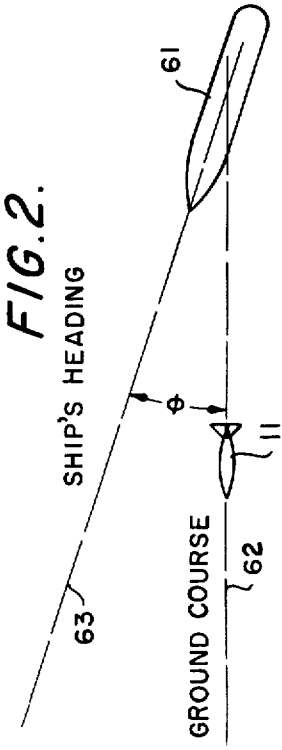
FIG. 2 is a diagrammatical illustration which discloses the operational principle of the invention.

In theory, as shown in FIG. 2, in event a master ship 61 is being exposed to some external force such as a wind or water current, it must head into that wind or water current at some drift compensating angle $\theta$, in order to maintain a desired ground course 62. At such time, ship 61 will have a heading 63 which may be quite deceptive as far as actual ground course is concerned. If a slave vehicle 11, such as, for instance, a mine hunting or mine sweeping vehicle, is intended to be driven ahead of said ship in such manner that its ground course will be the same as that subsequently traversed by master ship 61, it, too, will have to be guided to correct for angle $\theta$, as well as any other external forces acting thereon, inasmuch as it also may be exposed to wind and/or water currents; and, in order to automatically provide such necessary guidance for vehicle 11, the subject invention has been devised.

Figure 3:
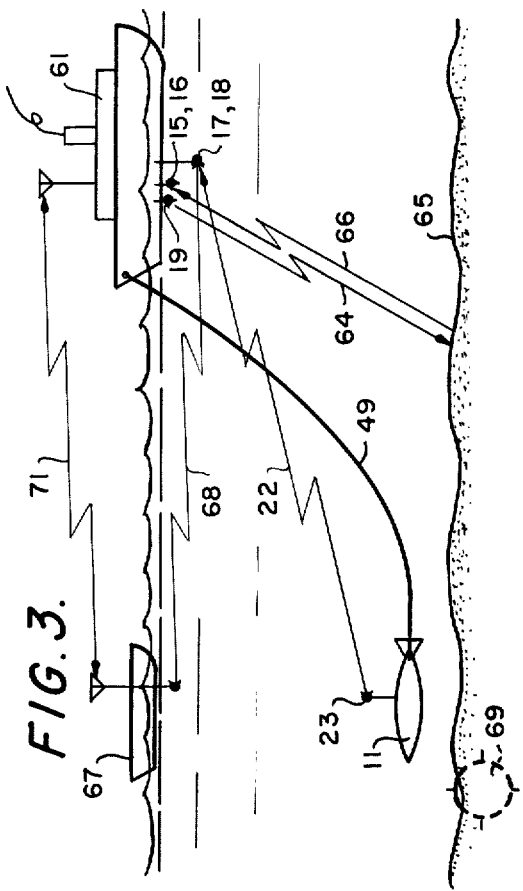
FIG. 3 is a schematic pictorial illustration of a typical mine hunting and/or sweeping operation which may incorporate the subject invention to an advantage.

FIG. 3 illustrates several possible operational systems which may incorporate the subject invention to an advantage. Many of the reference numerals used therein are similar to those used in FIGS. 1 and 2 because similar components are being defined thereby. Thus, forerunning slave vehicle 11 is being guided to travel along the projected ground course of master ship 61. In this particular case, vehicle 11 is a submarine vehicle. The ship's doppler system determines its true ground course by broadcasting acoustical energy 64 at any suitable frequency by transducer 19 and this energy is reflected from sea floor 65 as an echo 66 to doppler receiver transducers 15 and 16.

Sonar 23, located on slave vehicle 11, broadcasts acoustical energy 22 to transducers 17 and 18 so that its bearing relative thereto is known continuously, so that the desired guidance thereof may be automatically effected, as will be more fully discussed below in the discussion of the operation of the invention.

An appropriate surface vehicle 67 may be used in lieu of or in combination with vehicle 11. Its bearing may be indicated by either acoustical sonar energy 68 broadcast through the sea water or electromagnetic energy 71 broadcast by any conventional radio, or both, as preferred during any given operational procedures.

Inasmuch as this invention is primarily intended to be used in a mine hunting - mine sweeping operation, a mine 69, which may be located in the projected ground course of ship 61, may be destroyed, passivated, or otherwise dealt with, accordingly, so as to insure the safety of said ship, as it travels along said ground course.

Figure 4:
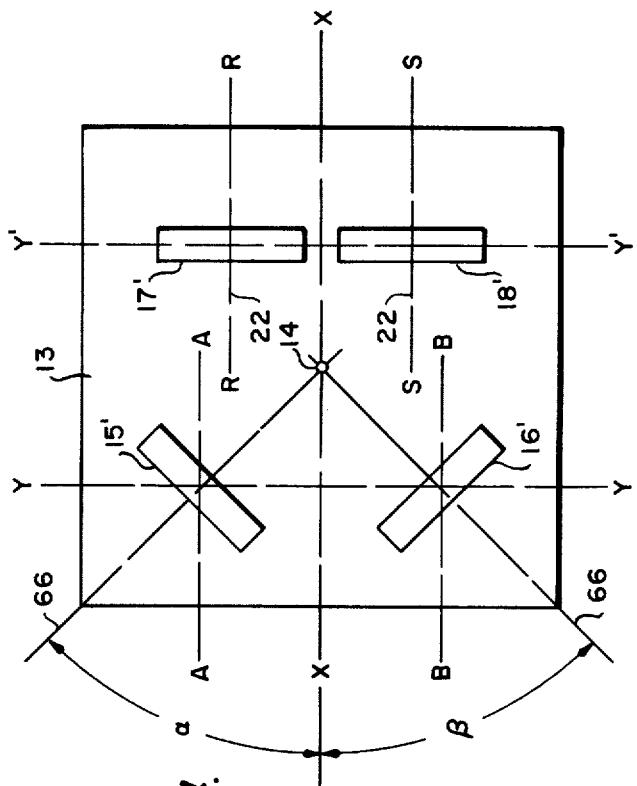
FIG. 4 is a diagrammatical representation of the reference platform assembly of FIG. 1, further showing the preferred disposition and relative relationship of the energy receiving faces of the various transducers mounted thereon.

FIG. 4 illustrates schematically and in detail a typical structural arrangement that may be used as the transducer - platform combination. Platform 13 is, of course, still rotatable about point 14 and axis X—X, which is intended to be aligned with the projected ground course of the ship at any given instant, passes therethrough.

Letting 15', 16', 17', and 18' represent the respective faces of transducers 15 through 18, it may readily be seen that their relationship relative to each other, to axis X—X, and to point 14 play an important part in obtaining optimum operation from this invention. For instance, it would appear to be noteworthy that transducer faces 15' and 16' are disposed at some predetermined angle, preferably 45°, with the X—X axis so that lines passing through the center thereof and point 14 form equal angles $\alpha$ and $\beta$ with said X—X axis and, hence, with the projected ground course of the ship when axis X—X is aligned therewith. Such arrangement is preferred because it effects difference doppler signal enhancement, so desirable for accurate ship ground course determination and, thus, facilitates the further processing thereof by the associated discriminator - summing network circuitry.

As shown, transducer faces 15' and 16' should also be so aligned that an axis Y—Y passing through the center thereof is normal to said X—X axis. Minor axes A—A and B—B respectively passing through the centers of transducer faces 15' and 16' are depicted as being parallel with axis X—X and equidistant therefrom.

Transducer faces 17' and 18' are centrally aligned with each other along an axis Y'—Y' which is normal to axis X-X and spatially disposed from axis Y—Y. Minor axes R-R and S-S respectively passing through the centers of transducer faces 17' and 18' are likewise depicted as being parallel with axis X—X and equidistant therefrom.

Figure 5:
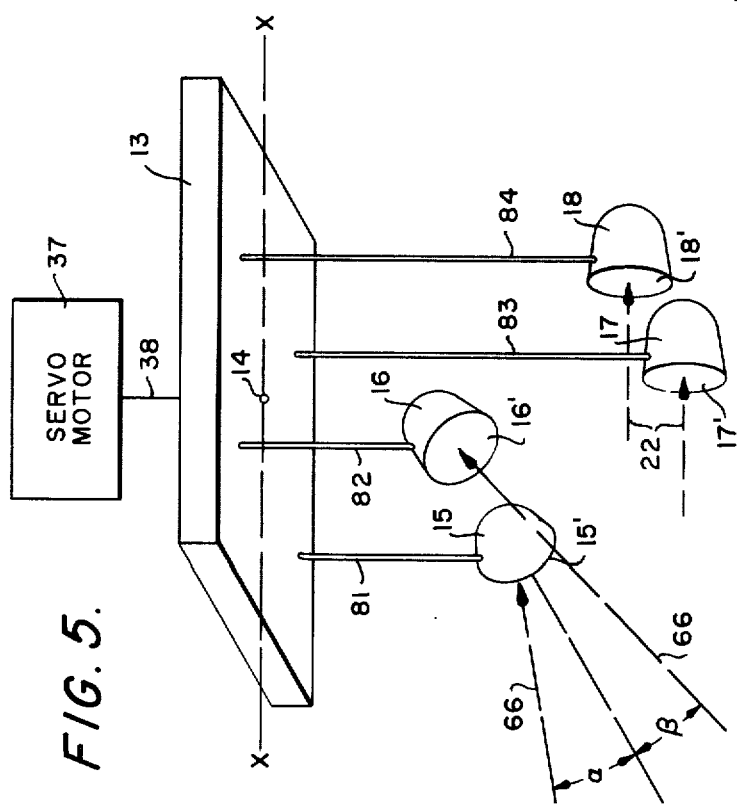
FIG. 5 is a combination pictorial-schematic representation of the reference platform of FIG. 1 and a typical arrangement of transducers which may be mounted thereon.

The relative disposition of doppler transducers 15 and 16 and slave vehicle position determining transducers 17 and 18 are preferably as shown in either FIGS. 4 or 5, but may be any suitable arrangement that does not cause interference to occur therebetween.

FIG. 5 is herewith presented in order to show that doppler transducers 15 and 16 are so slanted that their respective faces 15' and 16' face slightly forward at an appropriate angle, away from each other at some other suitable angle, and downwardly toward the sea floor. Although so shown, it should be understood that any comparable conventional arrangement of transducers 15 and 16 that will provide the proper reception of doppler signals reflected from the sea floor as the ship travels along will be satisfactory for this purpose.

Transducers 17 and 18 are, of course, disposed so that their respective faces 17' and 18' face substantially toward slave vessel 11 so that the instantaneous position signals broadcast therefrom will be readily received thereby. Hence, it is shown in this particular embodiment that they face forward because the slave vehicle is disclosed as a forerunning vehicle. However, if the slave vehicle is an aft-running vehicle, it would be obvious that transducers 17 and 18 should be rotated and mounted on platform 13 in such manner that their faces 17' and 18' substantially face the aft-running vehicle, so that they may readily receive the position signals broadcast therefrom.

Transducers 15 through 18, of course, may be fixedly mounted to platform 13 in any preferred conventional manner that enables them to perform their desired function. A plurality of pipes 81 through 84 may, for instance, be used for such purpose.

The operation of the invention will now be discussed briefly in conjunction with all FIGS.

Referring to FIG. 3, there is shown several typical possible master-slave coincident ground course operational arrangements that may be operated either separately or simultaneously and which may incorporate this invention to an advantage. Using the same reference numerals as used in FIGS. 1 and 2 for similar items for purpose of simplicity, the master ship 61 is causing slave vehicle 11 to be driven ahead and along the intended ground course thereof. Cable 49 interconnects vehicle attitude controller 48 located in ship 61 and attitude control surfaces 12 mounted on vehicle 11. Sonar 23, incorporated in slave vehicle 11, of course, causes acoustical energy 22 to be transmitted to receiving transducers 17 and 18 so that its position will be known relative thereto and, consequently, known relative to the ground course reference consisting of the aforementioned bisecting axis X—X therebetween.

Actual guidance is effected in this embodiment by using a doppler system to determine the true ground course of ship 61. This, in actual practice, is accomplished by causing transmitting transducer 19 to broadcast sonic energy 64 of a given frequency down toward the sea floor 65 at some predetermined angle where it is reflected back as an echo 66 therefrom to receiving transducers 15 and 16. If the same reflected doppler frequency is received by transducers 15 and 16 at the same time, the signal frequencies in channels 24 and 25 will be the same; hence, the output voltage of discriminators 27 and 29 will be equal in magnitude. Their internal connections are, of course, conventionally made such that the polarity of their respective voltage outputs are opposed, and, thus, when they are fed through resistances 32 and 33 are summed across resistance 35 of summing network 31, the net voltage thereacross is zero, a null occurs, no driving voltage is applied to servo amplifier 36, and servo motor 37 does not rotate platform 13. On the other hand, if the same doppler frequency is not simultaneously received by transducers 15 and 16, a voltage does appear across resistance 35 of summing network 31 of such polarity to cause servo amplifier 36 to run servo motor 37 in such direction to, in turn, rotate platform 13, located on ship 61, in the direction to cause the doppler frequencies received at transducers 15 and 16 to become the same. And, when so aligned, the bisector axis X—X between transducers 15 and 16 is parallel with the true ground course of ship 61. This aligned bisector axis X—X then becomes the reference from which the position of the slave vessel is measured and controlled at any given instant during the mine hunting and/or sweeping run. When measured and indicated as a drift angle $\theta$ between this true ground course and the heading of the ship by indicator 39, an appropriate steering correction may be made, in event it is desired to steer the ship over some preselected ground course, with this, of course, being an ancilliary benefit of using the subject invention.

As vehicle 11 runs ahead of ship 61, it transmits a sonic signal 22 back to transducers 17 and 18 so that its position will be known relative thereto. The frequency of the signal broadcast for this purpose is different from that used in the aforementioned doppler system so as to prevent undue interference therebetween. The respective frequencies selected, of course, are those that are most suitable for their respective operations. Because transducers 15 through 18 are all fixedly mounted on the same rotatable platform 13, when axis Y-Y passing through the center of transducers 15 and 16 are aligned normal to the ground course of ship 61, so are transducers 17 and 18, and if sonic signal 22 is simultaneously received thereby, vehicle 11 is running along the forwardly projected ground course of ship 61.

Assuming this to be the case for explanation purposes at this time, the outputs of transducers 17 and 18 will be in phase and, if delay lines 44 and 47 are set at zero delay, no output error signal will be produced by phase detector 45 and, hence, no corrective signal will be supplied to attitude control surfaces 12 by controller 48. On the other hand, if sonic energy 22 arrives at transducers 17 and 18 (which are now acting as a reference) in such manner that their outputs are not in phase, it is due to the fact that vehicle 11 is not running along the forwardly projected ground course of ship 61. In such case, phase detector 45 produces a compensatory signal proportional to the angular error, and this compensatory correction signal is then effectively transmitted by controller 48 along cable 49 to control surfaces 12. Hence, vehicle 11 is guided toward the desired ground course, and it automatically hunts therealong in such manner that it would sweep or detect any mine 69 that happens to be in its path and which would have been in the path of ship 61 following shortly thereafter, had it not been swept and neutralized or passivated by suitable equipment that may be located on vehicle 11 for that purpose.

In event that it is desired to run slave vehicle 11 parallel to but at some predetermined distance to the left or right of the ship's projected ground course, this type of operation may be effected by inserting appropriate delays in either of delay lines 44 or 47. This, of course, provides operation that would be considerably more versatile than would occur without such delay line arrangement.

As shown in FIG. 3, a surface type vehicle 67 may be also guided by the subject invention, and, as with submarine vehicle 11, it may be located and/or guided by a sonar signal 68, by a cable (not shown), or a radio link 71 as well, depending on the requirements of any given operations. As a matter of fact, any conventional telemetering link between the master vessel and slave vehicle that performs the desired communication or intelligence signal and guidance functions may be so employed in conjunction with this invention.

In addition, although vehicles 11 and 67 are depicted in the preferred embodiments of the invention as forerunning vehicles — that is, vehicles running ahead of the ground course of ship 61 — again it should be understood that the process may be reversed and both vehicles 11 and 67 may be aftrunning vehicles, inasmuch as so doing would be well within the purview of one skilled in the art having the benefit of the teachings herewith presented, and since so doing would not violate the intended spirit and scope of this invention.

It should also be understood that each of the elements illustrated in block form in FIG. 1 are well known and conventional per se, and that it is their unique arrangement, interconnections, and interactions that effect the subject invention and cause it to produce new and useful results.

Obviously, many modifications and other embodiments of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Means for navigating a plurality of substantially tandemly disposed vehicles along the predetermined course of one thereof comprising in combination, a first vessel, means mounted on said first vessel for determining the course thereof and aligning a predetermined reference means therewith, a second vessel adapted for being driven in tandem with said first vessel, means mounted on said second vessel for broadcasting a predetermined signal indicating the bearing thereof, means attached to said first vessel course determining means for determining the bearing deviation of said second vessel relative to said predetermined reference means in response to said second vessel bearing indication signal and for producing an error signal proportional thereto, means connected between said second vessel bearing deviation determining means and said second vessel for aligning said second vessel with said reference means and the course of said first vessel in response to said error signal.

2. Means for navigating a pair of tandemly disposed vehicles along the ground course of one thereof comprising in combination, a ship, means mounted on said ship for determining the ground course thereof and aligning a predetermined reference means therewith, a marine vehicle adapted for being driven in tandem with said ship, means mounted on said marine vehicle for broadcasting a predetermined signal indicating the bearing thereof, means attached to said ship course determining means for determining the deviation of said marine vehicle from said reference means in response to said marine vehicle bearing indication signal and for producing an error signal proportional thereto, means connected between said marine vehicle deviation determining means and said marine vehicle for the guidance thereof toward a position of alignment with the aforesaid reference means and hence the ground course of said ship in response to said error signal.

3. Means for respectively navigating a pair of spatially disposed vehicles along courses having a predetermined relationship with the ground course of one thereof comprising in combination, a ship, means mounted on said ship for determining the ground course thereof, means connected to said ground course determining means for aligning a reference means with said ground course, a marine vehicle adapted for being driven along a ground course having a predetermined relationship with said reference means and the ground course of said ship, means mounted on said marine vehicle for indicating the bearing thereof at any given instant, means mounted on said ship and effectively connected to the ground course determining means thereof for producing an error signal representative of the bearing of said marine vehicle relative to said ship's ground course and reference means in response to the aforesaid marine vehicle bearing indication, and means connected between the output of said error signal producing means and said marine vehicle for the guidance thereof along a ground course having a predetermined relationship with said ship's ground course and said corresponding reference means in response to the aforesaid error signal.

4. An automatic vehicle positioning system comprising in combination, a rotatable platform adapted for being mounted on a master vehicle and having a predetermined center about which it rotates and a first axis extending through said center adapted for being disposed in substantially the direction of a slave vehicle to be positioned, a first pair of transducers mounted on said rotatable platform with each thereof aligned with the other along a second axis that is normal to the aforesaid first axis and with each thereof disposed equidistant therefrom, a second pair of transducers mounted on said rotatable platform with each thereof aligned with the other along a third axis that is normal to said first axis and with each thereof disposed equidistant therefrom, means spatially disposed from said rotatable platform for broadcasting a first predetermined acoustical signal toward a reference surface, means coupled to said first pair of transducers for aligning said first axis with a predetermined course on said reference surface in response to a reflection of said first predetermined acoustical signal therefrom, means connected to the outputs of said second pair of transducers for producing an error signal representative of the deviation of the direction of a second predetermined signal received thereby from a slave vehicle to be positioned relative to said first axis, and means connected to the output of said error signal producing means for converting the error signal produced thereby into a guidance signal adapted to be transmitted to the slave vehicle to be positioned, whereby said slave vehicle is guided toward a projection of the aforesaid first axis an amount proportional to the deviation therefrom.

5. An automatic vehicle positioning system comprising in combination, a slave vehicle to be guided, means mounted on said slave vehicle for broadcasting a signal indicating the bearing thereof, control surfaces mounted on said slave vehicle adapted for guiding same, a master vessel adapted to run along a ground course, a rotatable platform mounted on said master vessel, said platform having a center about which it rotates and a first axis extending therethrough adapted for being aligned with the aforesaid ground course, means disposed on said master vessel for broadcasting a search signal toward said ground course, means located on said rotatable platform for receiving the ground course echo of said search signal, means connected to said ground course echo receiving means for rotating said platform to effect alignment of said first axis thereof along said ground course in response to the aforesaid echo of said search signal, means mounted on said rotatable platform for receiving the aforesaid slave vehicle bearing indicating signal, and means connected to said receiving means for producing an error signal proportional to the bearing deviation of said slave vehicle from a projection of the first axis of said rotatable platform.

6. An automatic vehicle positioning system comprising in combination, a slave vehicle to be guided, means mounted on said slave vehicle for broadcasting a signal indicating the bearing thereof, control surfaces mounted on said slave vehicle adapted for guiding same, a master vessel adapted to run along a ground course, a rotatable platform mounted on said master vessel, said platform having a center about which it rotates and a first axis extending therethrough adapted for being aligned with the aforesaid ground course, means disposed on said master vessel for broadcasting a search signal toward said ground course, means located on said rotatable platform for receiving the ground course echo of said search signal, means connected to said ground course echo receiving means for rotating said platform to effect alignment of the first axis thereof along said ground course in response to the aforesaid echo of said search signal, means mounted on said rotatable platform for receiving the aforesaid slave vehicle bearing indicating signal, means connected to said receiving means for producing an error signal proportional to the bearing deviation of said slave vehicle from a projection of the first axis of said rotatable platform, and means coupled between the output of said error signal producing means and the control surfaces mounted on said slave vehicle for the guidance thereof in such direction that said error signal is substantially eliminated.

7. Means for guiding a marine vehicle along the projected ground course of a ship comprising in combination,
- a ship adapted for traveling along a predetermined ground course,
- a marine vehicle adapted for being guided along a predetermined projection of the aforesaid ground course,
- means mounted on said marine vehicle for transmitting a signal indicating the instantaneous bearing thereof,
- rotatable platform means mounted on said ship, said rotatable platform means having a predetermined point about which it may be rotated and a first axis extending therethrough in such manner that it may be aligned with the ground course of said ship upon the proper rotation of said rotatable platform means,
- means disposed on said ship for transmitting an echo-search signal toward the ground course thereof,
- a first pair of transducers mounted on said rotatable platform means with each thereof aligned with the other along a second axis that is perpendicular to the aforesaid first axis and with each thereof located equidistant therefrom,
- a second pair of transducers mounted on said rotatable platform means with each thereof aligned with the other along a third axis that is parallel to said second axis and equidistant from said first axis,
- means connected to the outputs of said first pair of transducers for rotating said platform to effect alignment of the first axis thereof along the ground course of said ship in response to the echo of the aforesaid echosearch signal received thereby,
- means connected to the outputs of said second pair of transducers for producing an error signal proportional to the instantaneous bearing deviation of said marine vehicle from said predetermined projection of the aforesaid ship's ground course in response to said marine vehicle's bearing indicating signal,
- means connected to the output of said error signal producing means for converting the error signal produced thereby to a proportional error compensating signal, and
- means connected to the output of said converting means for guiding said marine vehicle toward the projected ground course of said ship in response to said error compensating signal.

8. The device of claim 7 wherein said marine vehicle is a submarine vehicle capable of running at a predetermined distance from the ocean floor while being guided along the aforesaid ship's projected ground course.

9. The device of claim 7 wherein said marine vehicle is a surface vehicle.

10. The device of claim 7 wherein said ground course projection is a projection that extends forward of said ship as it travels along a predetermined ground course.

11. The device of claim 7 wherein said ground course projection is a projection that extends rearward of said ship as it travels along a predetermined ground course.

12. The device of claim 7 wherein said means mounted on said marine vehicle for transmitting a signal indicating the instantaneous bearing thereof is a sonar transmitter.

13. The device of claim 7 wherein said means disposed on said ship for transmitting an echo-search signal toward the ground course thereof comprises,
- an electroacoustical transducer mounted on said ship in such manner that the acoustical energy broadcast thereby is directed toward the sea floor over which said ship is traveling, and
- a transmitter with the output thereof coupled to the input of said electroacoustical transducer for the energization thereof.

14. The device of claim 7 wherein said first pair of transducers are electroacoustical transducers mounted on said rotatable platform in such manner as to receive the echo of the echo-search signal transmitted toward the ground course of said ship.

15. The device of claim 7 wherein said second pair of transducers are electroacoustical transducers mounted on said rotatable platform in such manner as to receive the instantaneous bearing indicating signal transmitted from said marine vehicle.

16. The device of claim 7 wherein said means connected to the outputs of said second pair of transducers for producing an error signal proportional to the instantaneous bearing deviation of said marine vehicle from said predetermined projection of the aforesaid ship's ground course in response to said marine vehicle's bearing indicating signal comprises,
- a pair of adjustable delay lines effectively and respectively coupled to the outputs of said second pair of transducers, and
- a phase detector coupled to the outputs of said pair of adjustable delay lines.

17. The device of claim 7 wherein said means connected to the output of said error signal producing means for converting the error signal produced thereby to a proportional error compensating signal comprises a vehicle attitude controller.

18. The device of claim 7 wherein said means interconnecting the output of said converting means for guiding said marine vehicle toward the projected ground course of said ship in response to said error compensating signal is an attitude control surface means mounted on said marine vehicle.

19. The device of claim 7 wherein said means connected to the outputs of said first pair of transducers for rotating said platform to effect alignment of the first axis thereof along the ground course of said ship in response to the echo of the aforesaid echo-search signal received thereby comprises,
- a pair of discriminators effectively and respectively connected to the outputs of said first pair of transducers,
- a summing network coupled to the outputs of said pair of discriminators,
- a servo amplifier coupled to the output of said summing network, and
- a servo motor interconnecting the output of said servo amplifier and the aforesaid rotatable platform.

20. The invention according to claim 19 further characterized by a ground course indicator connected to the output of said servo amplifier.

21. The invention according to claim 19 further characterized by means effectively connected to said rotatable platform means for the stabilization thereof in substantially a horizontal plane as it is being rotated by said servo motor to effect alignment of the first axis thereof along the ground course of said ship.

* * * * *